United States Patent
Bae et al.

(10) Patent No.: US 8,515,394 B2
(45) Date of Patent: Aug. 20, 2013

(54) METHOD FOR CONTROLLING ACCESS OF SUBSCRIBERS IN WIRELESS COMMUNICATION SYSTEM SUPPORTING FEMTO CELL AND APPARATUS FOR THE SAME

(75) Inventors: Hyung Deug Bae, Daejeon-si (KR); Nam Hoon Park, Daejeon (KR)

(73) Assignee: Electronics and Telecommunications Research Institute, Daejeon-si (KR)

( * ) Notice: Subject to any disclaimer, the term of this patent is extended or adjusted under 35 U.S.C. 154(b) by 0 days.

(21) Appl. No.: 13/332,013

(22) Filed: Dec. 20, 2011

(65) Prior Publication Data

US 2012/0157051 A1    Jun. 21, 2012

(30) Foreign Application Priority Data

Dec. 20, 2010  (KR) .................. 10-2010-0130705

(51) Int. Cl.
*H04M 1/66* (2006.01)
*H04M 1/68* (2006.01)
*H04M 3/16* (2006.01)
*H04W 4/00* (2009.01)

(52) U.S. Cl.
USPC ....................................... 455/411; 455/435.1

(58) Field of Classification Search
USPC .............. 455/411, 434, 435.1, 436, 437, 444, 455/450, 452.1
See application file for complete search history.

(56) References Cited

U.S. PATENT DOCUMENTS

| | | | |
|---|---|---|---|
| 2009/0088135 A1 | 4/2009 | Kekki et al. | |
| 2009/0094351 A1 | 4/2009 | Gupta et al. | |
| 2010/0112982 A1* | 5/2010 | Singh et al. | 455/411 |
| 2011/0300867 A1* | 12/2011 | Matsuo et al. | 455/436 |

* cited by examiner

*Primary Examiner* — Marisol Figueroa
*Assistant Examiner* — Erica Navar
(74) *Attorney, Agent, or Firm* — Nelson Mullins Riley & Scarborough LLP

(57) ABSTRACT

Disclosed is a method for controlling access of subscribers of a gateway in a communication system supporting a femto cell, the method including: by user equipment (UE), receiving a first access request message, which makes a request to access a femto base station (BS), from the femto BS; directly acquiring a business subscriber database (DB), which includes a list of UE admittable to access the femto BS, from a DB module; and determining whether to admit the access of the UE on the basis of the business subscriber DB, wherein the determining whether to admit the access of the UE includes admitting the access of the UE if a user equipment identifier (UE ID) for identifying the UE is included in the list of UE.

8 Claims, 8 Drawing Sheets

METHOD FOR CONTROLLING ACCESS OF SUBSCRIBERS IN WIRELESS COMMUNICATION SYSTEM SUPPORTING FEMTO CELL AND APPARATUS FOR THE SAME

CROSS-REFERENCE TO RELATED APPLICATIONS

This application claims the benefit of priority of Korean Patent Application No. 10-2010-0130705 filed on Dec. 20, 2010, which is incorporated by reference in their entirety herein.

BACKGROUND OF THE INVENTION

1. Field of the Invention

The present invention relates to wireless communications supporting a femto cell, and more particularly, to a method for controlling access of subscribers receiving services in a wireless communication system, and an apparatus for supporting the same.

2. Related Art $3^{rd}$ generation partnership project (3GPP) long term evolution (LTE), improved from a universal mobile telecommunications system (UMTS), has been introduced as 3GPP release 8. The 3GPP LTE uses an orthogonal frequency division multiple access (OFDMA) for a downlink, and uses a single carrier-frequency division multiple access (SC-FDMA) for an uplink. Further, the 3GPP LTE employs a multiple input multiple output (MIMO) having the maximum four antennas. Recently, 3GPP LTE-advanced (LTE-A) evolved from the 3GPP LTE has been under discussion.

With development of wireless communications, a heterogeneous network environment has been on the rise.

The heterogeneous network environment refers to an environment where a macro cell, a femto cell, etc. coexist. As opposed to the macro cell, the femto cell is a system that covers a zone smaller than a radius of the existing mobile communication services. Thus, the femto cell can be used as an alternative to solve a shadow zone in a home, an office or the like interior, and is in the limelight as a communication system for wired/wireless convergence services.

The femto base station (BS) supporting the femto cell is connected to an internet protocol (IP) network spread in a home or an office, and accesses a core network (CN) of a mobile communication system through the IP network, thereby providing mobile communication service. That is, the femto BS may be connected to the CN of the mobile communication system through a digital subscriber line (DSL). A user of the mobile communication system may receive the service in the outdoors through the existing macro cell, but receive the service in the indoors through the femto cell. The femto cell improves indoor coverage of the mobile communication system by making up for that the service of the existing macro cell becomes deteriorated in a building, and provides the service intended for the a specific user, thereby providing voice and data service of high quality. Further, the femto cell can provide a new service not given in the macro cell, and the spread of the femto cell may cause fixed-mobile convergence (FMC) to be accelerated and an industrial-based cost to be reduced.

The femto cell includes a closed subscriber group (CSG) cell that provides services to only a set specific user group, and a non-CSG cell that provides services general users. Here, the specific user group that can receive services from the CSG cell will be called a CSG, and a user who belongs to the corresponding group will be called a CSG user. Further, users other than the CSG users will be called a non-CSG user.

To make user equipment (UE) have an access to the CSG cell, it has to previously determine whether the corresponding cell admits the access of the UE. However, a list of UE admitted to access the CSG cell may be varied depending on a network environment, and change in a contract between a service provider and a subscriber. Accordingly, a method for controlling the access of the UE by more efficiently changing the list of admitted UE.

SUMMARY OF THE INVENTION

The present invention provides a method for controlling access of subscribers in a wireless communication system supporting a femto cell, and an apparatus for supporting the same.

In an aspect, there is provided a method for controlling access of subscribers of a gateway in a communication system supporting a femto cell, the method including: by user equipment (UE), receiving a first access request message, which makes a request to access a femto base station (BS), from the femto BS; directly acquiring a business subscriber database (DB), which includes a list of UE admittable to access the femto BS, from a DB module; and determining whether to admit the access of the UE on the basis of the business subscriber DB, wherein the determining whether to admit the access of the UE includes admitting the access of the UE if a user equipment identifier (UE ID) for identifying the UE is included in the list of UE.

The business subscriber DB may be modified according to whether the UE is accessible to the femto BS.

The first access request message may include: the UE ID; and a closed subscriber group (CSG) ID of the femto BS.

If the access of the UE is refused, the method may further include a second access request message including the UE ID and the CSG ID is transmitted to a mobility management entity (MME).

The transmitting the second access request message may include forwarding the first access request message to the MME.

If the access of the UE is admitted, the method may further include transmitting the second access request message including the UE ID to the MME.

The transmitting the second access request message may include forwarding the first access request message, of which the CSG ID is removed, to the MME.

In another aspect, there is provided a system for controlling access of user equipment (UE) in a communication system supporting a femto cell, the system including: a femto base station (BS) which receives a first access request message of making a request to access the femto BS from the UE and transmits a second access request message of requesting the access of the UE to a gateway; a database (DB) module which stores a business subscriber database (DB) including a list of UE admittable to access the femto BS; and the gateway which receives the second access request message, directly acquires the business subscriber DB from the DB module, and determines whether to admit the access of the UE on the basis of the business subscriber DB, wherein the determining whether to admit the access of the UE includes admitting the access of the UE if a user equipment identifier (UE ID) for identifying the UE is included in the list of UE.

The business subscriber DB may be modified according to whether the UE is accessible to the femto BS.

The first access request message may include the UE ID, and the second access request message may include the UE ID for identifying the UE and a closed subscriber group (CSG) ID of the femto BS.

If the gateway refuses to the access of the UE to the femto BS, the gateway may transmit a third access request message including the UE ID and the CSG ID to a mobility management entity (MME).

The transmitting the third access request message to the MME may include forwarding the second access request message to the MME.

If the gateway admits the access of the UE to the femto BS, the gateway may transmit a third access request message including the UE ID to the MME.

The transmitting the third access request message to the MME may include forwarding the second access request message, of which the CSG ID is removed, to the MME.

In still another aspect, there is provided a gateway for controlling access of user equipment (UE) in a wireless communication system supporting a femto cell, the gateway including: a memory which stores at least one of a user equipment identifier (UE ID) for identifying the UE that makes a request to access the femto BS and a closed subscriber group (CSG) ID for identifying the femto BS; and a processor which operates functionally combining with the memory, wherein the processor by user equipment (UE), receives a first access request message, which makes a request to access a femto base station (BS), from the femto BS; directly acquires a business subscriber database (DB), which includes a list of UE admittable to access the femto BS, from a DB module; and determines whether to admit the access of the UE on the basis of the business subscriber DB, the determining whether to admit the access of the UE including admitting the access of the UE if the UE ID is included in the list of UE.

DESCRIPTION OF EXEMPLARY EMBODIMENTS

Figure 1:
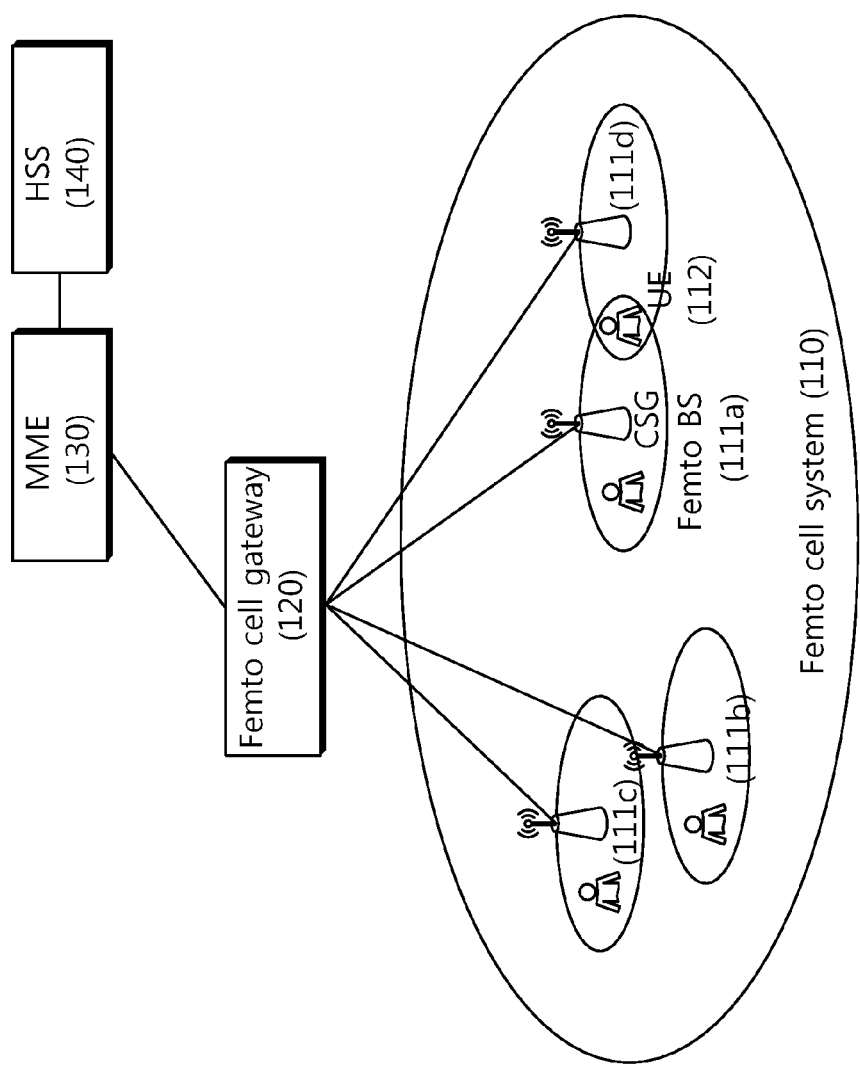
FIG. 1 shows a structure of a business femto cell system.

A femto cell is based on a small base station (BS) supporting a relatively small coverage, which has been developed for supporting wireless communications generally in the interior such as a home or an office. A femto BS for a femto cell has a very lower transmission power and a narrower coverage than a macro BS for a macro cell which serves as a basis for a general wireless communication system, so that it can provide services to a few UE in general.

In a wireless communication system supporting the femto cell, an operation mode of the femto BS may be classified into three, i.e., an open mode, a closed mode and a hybrid mode in accordance with control methods of a user's access. The open mode refers to an operation mode which provides services by qualifying any user for membership without limiting qualification of a user who wants to have an access to the femto BS and subscribe for the femto cell. The closed mode attaches restrictive conditions to a user's qualification for subscribing for the femto cell, thereby allowing a certain user to subscribe for the cell and receive the services. A group of users who have subscribed for the cell will be called a closed subscriber group (CSG), and a user belonging to the CSG and his/her UE will be called a CSG user and a CSG UE, respectively. The CSG user is a relative term. For example, someone may be a CSG user with regard to a first femto BS, but may be a non-CSG user with regard to a second femto BS. The hybrid mode, where the open mode and the closed mode are combined, provides services as the closed mode for the CSG user, but as the open mode for the non-CSB user. However, the femto cell operating in the hybrid mode gives priority of receiving the services to the CSG users in light of resource allocation and access control.

The femto cell operating in the CSG mode has its own CSG identifier (ID), and only the UE admitted to access the femto cell indicated by the corresponding CSG ID can access the femto BS. The UE has its own admittable CSG list. If the admission CSG list of the UE includes the CSG ID of the femto BS, the UE can be admitted to the femto BS. That is, the UE can be admitted to the femto BS having the CSG ID included in its own admittable CSG list.

A home subscriber system (HSS) administered by a mobile communication service provider manages the admittable CSG list of all UE. To make the UE be successfully admitted to the femto BS operating in the CSG mode, the admittable CSG list of the corresponding UE managed by the HSS has to include the CSG ID of the BS. If the CSG ID of the femto BS is not included in the admittable CSG list of the UE, the admission is not possible. For example, if a business, which administers the CSG femto cell for in-company wireless communication, establishes or cancels employment relationships with an employee in accordance with personal management, there is required managements such as change, modification, addition, etc. of the CSG list. The CSG list managed by the HSS may be changed by making a request to the mobile communication service provider. However, the management of the CSG list through the mobile communication service provider may cause problems such as difficulty in instantly changing access authority, a troublesome procedure, and delayed time. Accordingly, there is required a method for managing the access of the UE to the femto cell by more efficiently managing the CSG list.

FIG. 1 shows a structure of a business femto cell system. A femto cell system 110 includes one or more femto BSs 111a, 111b, 111c and 111d. A femto cell gateway (GW) 120, a mobile management entity (MME) 130, and a home subscriber system (HSS) 140 are devices administered by a mobile communication service provider. The femto BS interlocks with the MME 130 through the femto cell GW 120. The femto BS is generally administered in the CSG mode, and all femto cells belonging to one business network uses one CSG ID. Alternatively, the CSG IDs assigned to the respective femto BSs may be different from one another if an access admittable object to a specific femto cell is differently set up even within the business network, for example, if the access authority to the each femto BS is differently set up in accordance with positions or ranks of subscribers and thus the position or rank the access of which is admittable to the femto BS is separately set up.

If the UE 112 makes an access request to the femto BS 111a operating in the CSG mode, the femto BS 111a operating in the CSG mode transmits an access request message of the UE to the femto cell GW 120. The MME 130 interlocks with the HSS 140 and performs access control for determining whether to admit the access of the UE.

Figure 2:
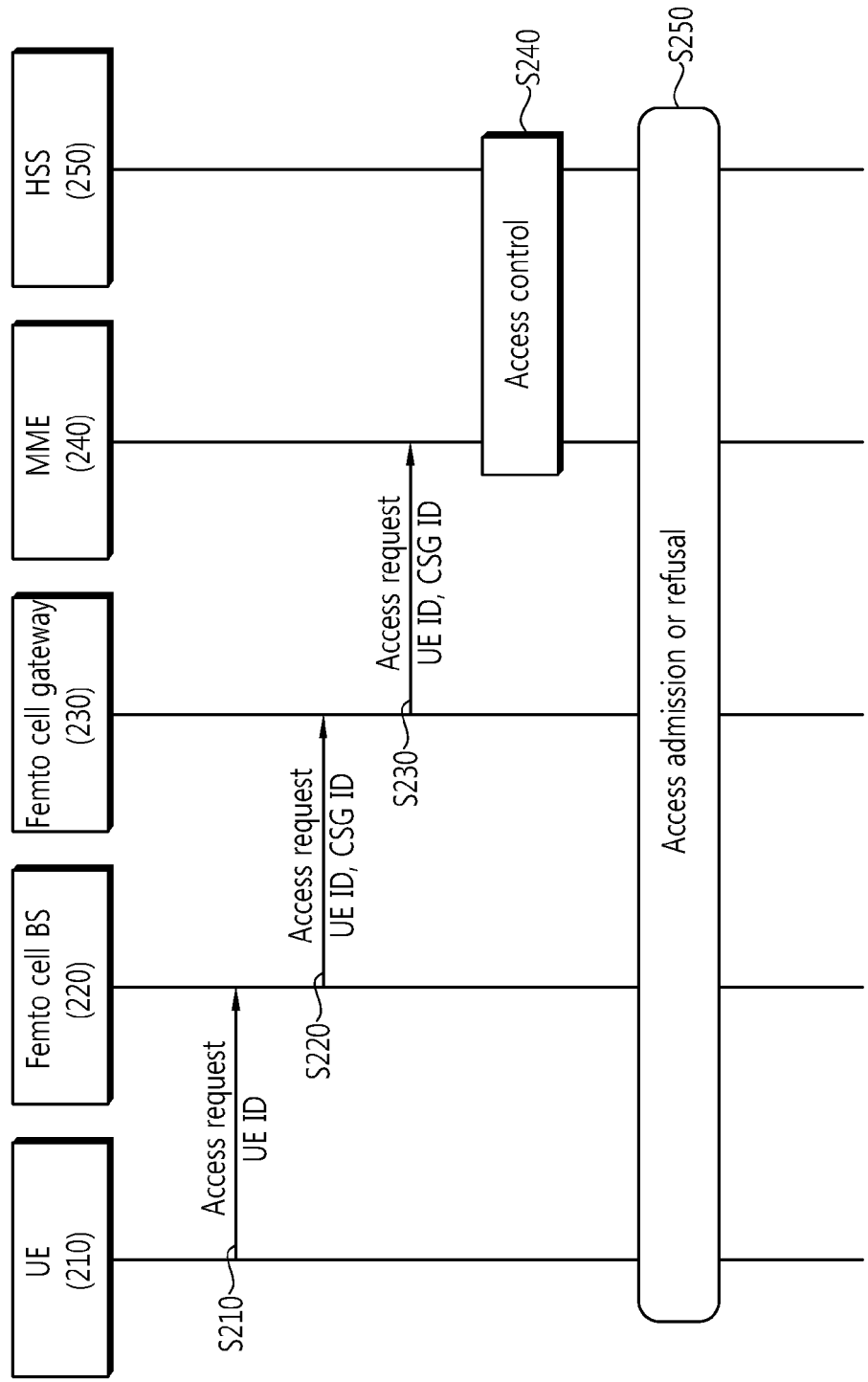
FIG. 2 shows a message flow in a method for controlling access of subscribers.

FIG. 2 shows a message flow in a method for controlling access of subscribers.

Referring to FIG. 2, the UE 210 transmits an access request message for accessing the cell to the femto BS 220 operating in the CSG mode (S210). The access request message includes a user equipment identifier (UE ID).

The femto BS 220 that receives the access request message transmits the access request message to the femto cell GW 230 (S220). The access request message transmitted from the femto BS 220 to the femto GW 230 includes the UE ID and the CSG ID of the femto BS 220. The femto BS 220 may add the CSG ID to the access request message received from the UE 210 at the operation S210, and then transmit it to the femto cell GW 230.

The femto cell GW(230) transmits the access request message, received from the femto BS(220), to a MME(240).

The MME 240 performs the access control for determining whether to admit the access of the UE 210 to the femto BS 220 if the access request message received from the femto cell GW 230 includes the CSG ID (S240). If the CSG ID is included in the access request message, it means that the femto BS 220 is administered in the CSG mode. Accordingly, it has to be determined whether to admit the access of the UE by performing the access control for determining whether the UE is a CSG membership UE admitted to access the femto BS. Conversely, if the CSG ID is not included in the access request message, it means that the corresponding femto BS is not the BS administered in the CSG mode and there is no need for determining whether the access of the UE to the femto BS is admitted. In other words, there is no need of performing the access control.

In the access control (S240) performed by the MME 240, the admittable CSG list of the UE 210 managed by the HSS 250 is checked, and the access is admitted if the CSG ID of the femto BS 220 included in the access request message (S230) exists in the admittable CSG list, but not admitted otherwise.

The MME 240 admits or refuses the access of the UE in accordance with a result of the access control (S240) (S250).

Figure 3:
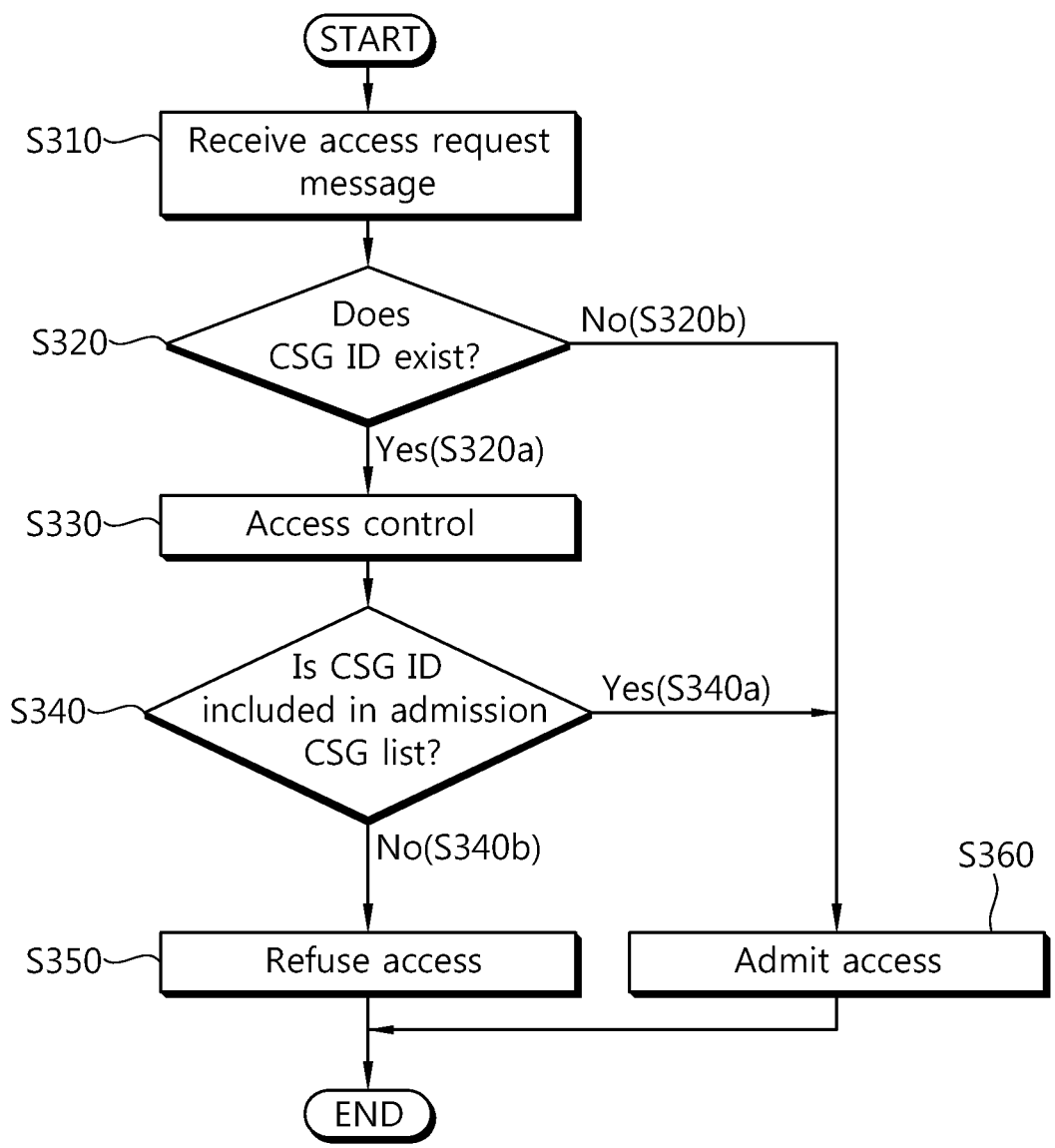
FIG. 3 is a flowchart showing that a mobility management entity (MME) performs an access control in a wireless communication system supporting a femto cell system.

FIG. 3 is a flowchart showing that a mobility management entity (MME) performs an access control in a wireless communication system supporting a femto cell system.

Referring to FIG. 3, the MME 240 receives an access request message (S310), and determines whether the message includes the CSG ID (S320), If the CSG ID is included (S320a), the access control is performed (S330). If the CSG ID is not included (S320b), an access admission procedure is proceeded without performing the access control (S360).

If the CSG ID included in the access request message is included in the admittable CSG list of the UE managed by the HSS 250 (S340a), the access admission procedure is proceeded (S360). If the CSG ID is not included in the admittable CSG list (S340b), an access refusal procedure is proceeded (S350).

However, the admittable CSG list managed by the HSS 250 may be modified or changed by the mobile communication service provider, so that the change can be delayed or the procedure can be cumbersome. Therefore, it is not proper under the condition that the list of UE accessible to the CSG mode femto BS is consecutively varied like a business femto cell system. Below, a method of making up for this problem will be described.

Figure 4:
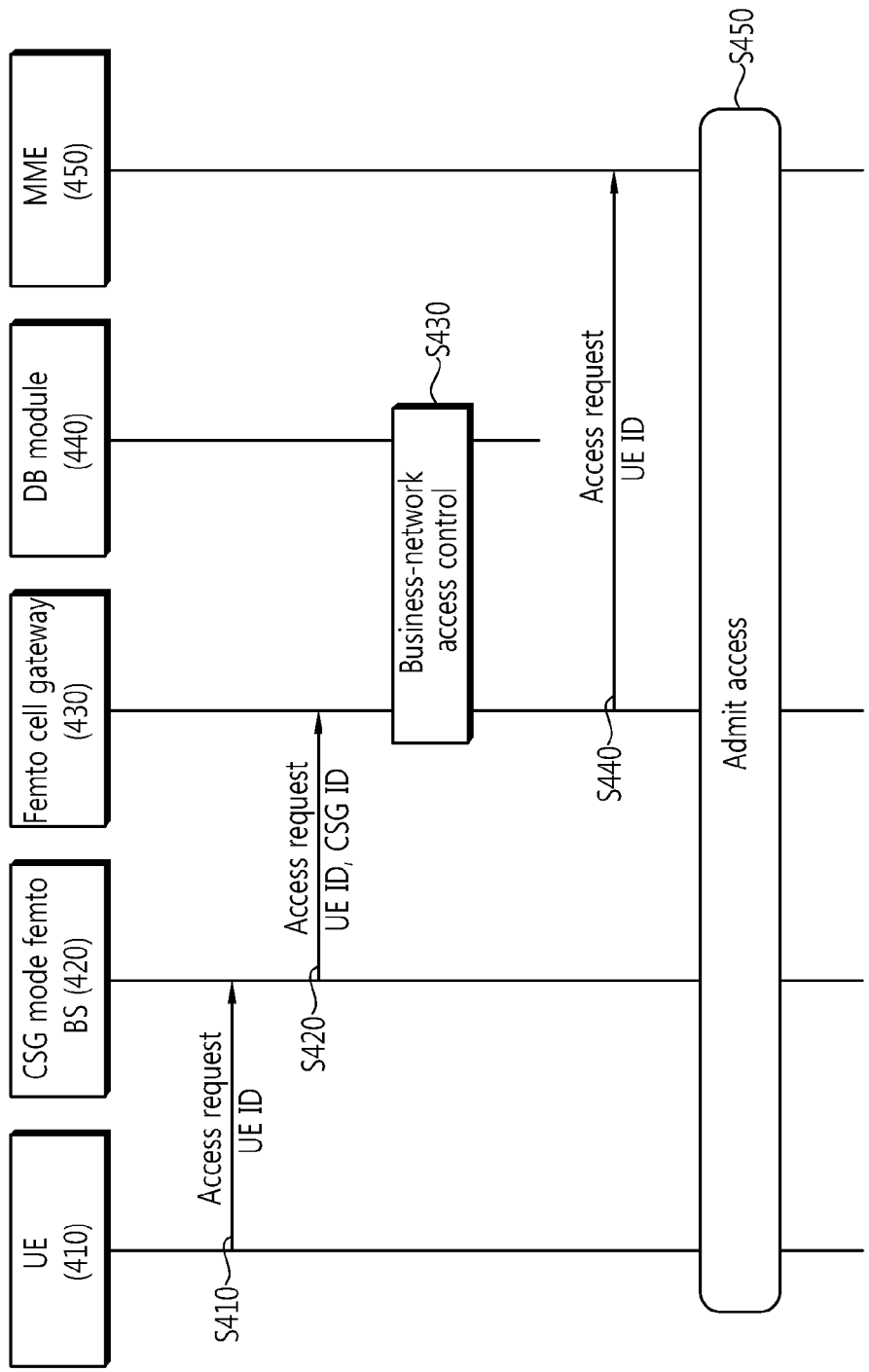
FIG. 4 is a flowchart showing an access admission procedure based on the method for controlling the access of the subscribers in accordance with an exemplary embodiment of the present invention.

FIG. 4 is a flowchart showing the access admission procedure based on the method for controlling the access of the subscribers in accordance with an exemplary embodiment of the present invention.

Referring to FIG. 4, UE 410 transmits an access request message for accessing a femto BS to a CSG mode femto BS 420 (S410). The access request message includes a UE ID indicating identifier of UE 410.

The femto BS 420 receiving the access request message transmit a access request message to femto cell GW 430 (S420). The access request message includes UE ID and CSG ID indicating the CSG mode femto BS 420.

The femto cell GW 430 that receives the access request message from the CSG mode femto BS 420 performs business-network access control to ascertain whether the UE 410 is an object accessible to the femto BS 420 (S430). While the existing access control is performed by the MME and the access control is based on the admittable CSG list managed by the HSS, the business access control is based on a business subscriber database (DB).

To perform the business access control, a business subscriber DB is directly acquired from a DB module 440 storing the business subscriber DB. The DB module 440 may be included in the femto cell GW or externally provide as an independent device.

The business subscriber DB includes a list of UE admittable to access a specific femto BS, which is managed separately from the admittable CSG list of UE managed by the HSS.

The femto cell GW 430 determines whether the UE 410 is admitted to access the CSG mode femto BS 420 on the basis of the business subscriber DB 440. This may be based on an admittable UE list stored in the business subscriber DB, and may be determined according to whether the UE ID is included in the admitted UE list. If the UE ID of the UE 410 exists in the admittable UE list stored in the business subscriber DB, the UE 410 is admitted to access the femto BS 420. Otherwise, the access of the UE 410 is refused.

If the access of the UE is admitted, the femto cell GW 430 deletes the CSG ID of the access request message received from the CSG femto BS 420 and transmits the access request message to the MME 450 (S440).

Since the MME 450 receives the access request message without the CSG ID, the MME 450 does not perform the access control and performs a procedure of admitting the access of the UE 410 to the CSG mode femto BS 420 (S450).

Figure 5:
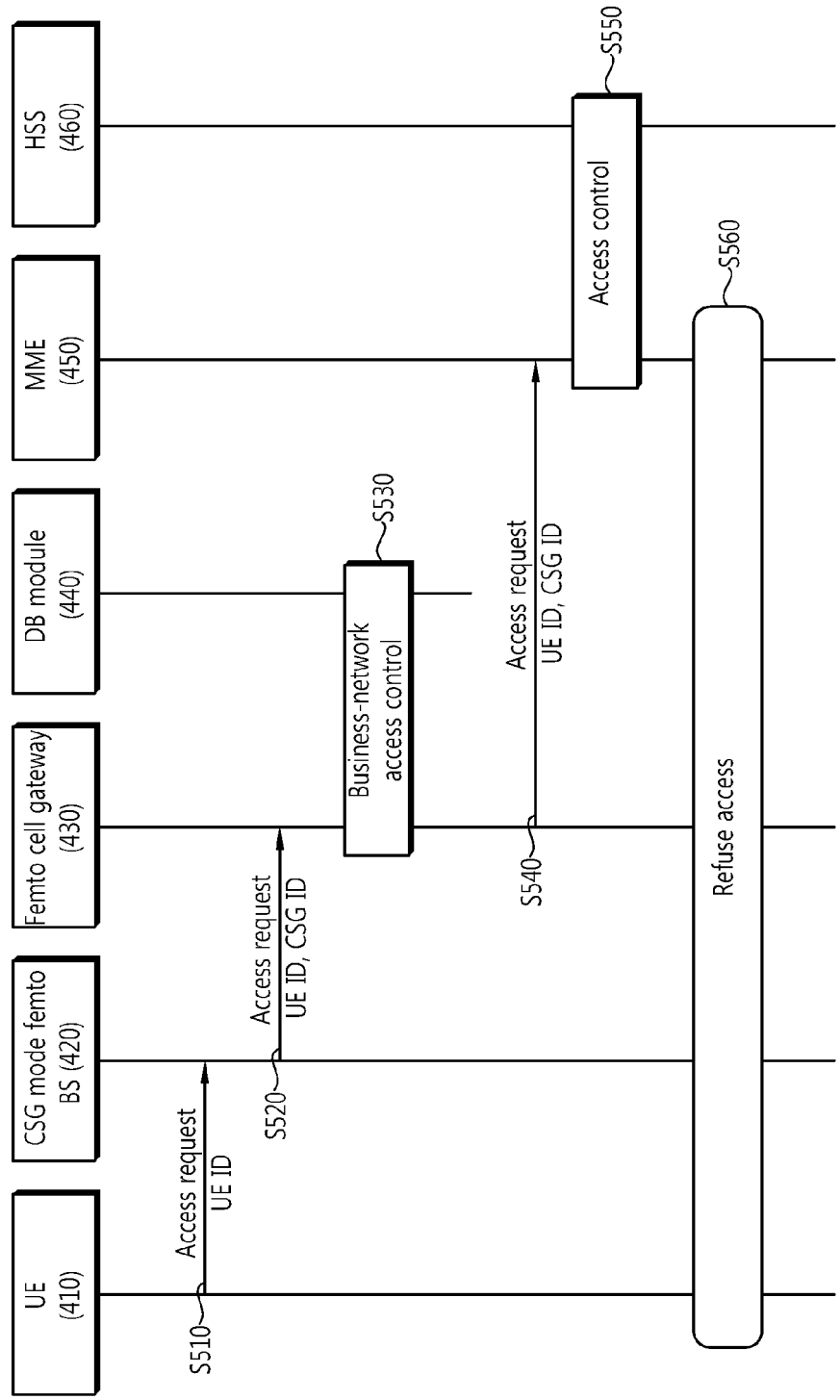
FIG. 5 is a flowchart showing an access refusal procedure based on the method for controlling the access of the subscribers in accordance with an exemplary embodiment of the present invention.

FIG. 5 is a flowchart showing an access refusal procedure based on the method for controlling the access of the subscribers in accordance with an exemplary embodiment of the present invention.

Referring to FIG. 5, an operation 5510 where the UE 410 transmits an access request message with the UE ID to the CSG mode femto BS, an operation 5520 where the CSG mode femto BS 420 transmits the access request message with the UE ID and the CSG ID to the femto cell GW 430, and an operation 5530 where the femto cell GW 420 performs the business-network access control correspond to the operations 5410, 5420 and S430 of FIG. 4, and thus repetitive descriptions thereof will be avoided.

In the business-network access control (S530), if the UE 410 is not admitted to the CSG mode femto BS, the femto cell GW 430 transmits an access request message with the UE ID and the CSG ID to the MME 440.

Since the CSG ID exists in the received access request message, the MME 440 performs the access control together with the HSS 460 (S550). Here, the CSG ID included in the access request message is not included in the admittable CSG list of the UE 410 managed by the HSS 250, so that the access of the UE 410 to the CSG mode femto BS 420 can be refused. Thus, the MME performs the access refusal procedure (S550). On the other hand, if the CSG ID included in the access request message is included in the admittable CSG list of the UE 410 managed by the HSS 250, the UE 410 is admitted to access the CSG mode femto BS 420.

Referring to FIGS. 4 and 5, it will be appreciated that whether the UE is admitted to access the femto BS is primarily determined on the basis of the business subscriber DB. The business subscriber DB may be changed, added and modified by a business femto cell manager regardless of the mobile communication service provider. Accordingly, the access of the UE can be flexibly and quickly controlled by directly managing the business subscriber DB without making a request to the mobile communication service provider when qualifications for subscribing for the femto cell or other network environments are varied.

Figure 6:
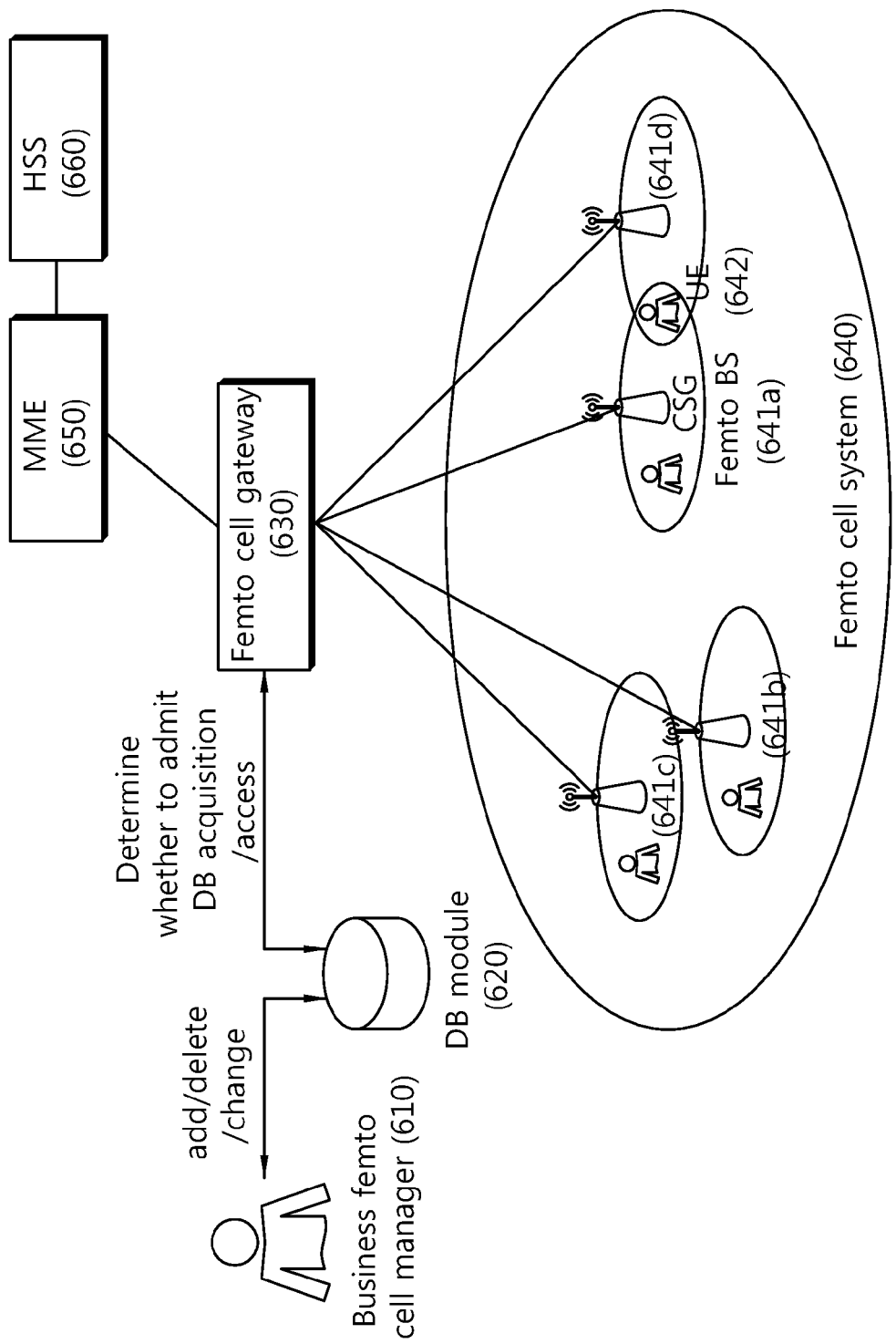
FIG. 6 shows a system for controlling access of business femto cell subscribers in accordance with an exemplary embodiment of the present invention.

FIG. 6 shows a system for controlling access of business femto cell subscribers in accordance with an exemplary embodiment of the present invention. The system for controlling the access of the business femto cell subscriber includes a business femto cell manager, a DB module storing a business subscriber DB, and a femto cell GW.

Referring to FIG. 6, a DB module 620 is provided with a business subscriber DB for controlling the access of the business femto cell subscribers so that the business subscriber DB can interlock with the femto cell GW 630. The DB module 620 may be located outside the femto cell GW 630 as shown in FIG. 6, but may be an element constituting the femto cell GW 630. The business subscriber DB includes information for determining whether the UE is admitted to access the femto cell, such as the femto BS and the UE ID for each femto BS, and includes information about whether to admit the access with regard to the UE ID.

The business femto cell manager 610 may access the DB module 620 and add, delete and change the business subscriber DB. Accordingly, if a business establishes or cancels employment relationships with an employee in accordance with personal management, the business femto cell manager 610 performs relevant management based on addition, deletion and change of the business subscriber DB.

The business femto cell system 640 includes at least one femto BS 641a, 641b, 641c and 641d. Further, at least one UE may access each femto BS.

A femto cell GW 630, an MME 650, and an HSS 660 are a network for the mobile communication service provider. The femto BS 641a, 641b, 641c and 641d interlocks with the MME 650 through the femto cell GW 630.

The femto BS constituting the business femto cell system 640 is generally administered in the CSG mode, and all femto BSs belonging to one business network may use one CSG ID. Alternatively, if qualifications for accessing individual femto cells formed in each femto BS are separately given, the respective CSG IDs may be differently formed or the femto BS using the same CSG ID may be formed as a plurality of groups to be administered.

A UE 642 transmits an access request message with the UE ID as information for identifying the UE to the femto BS 641a, thereby starting initial access.

The femto BS 641a sends the femto cell GW 630 the access request message including the CSG ID, which is identification information for the BS administered in the CSG mode and used as a reference for distinguishing a list of accessible UE, and the UE ID indicating the UE 642.

The femto cell GW 630 directly acquires the stored business subscriber DB through the DB module 620, and performs the business-network access control on the basis of the business subscriber DB. Specifically, the femto cell GW 630 performs the business-network access control for determining whether to admit the access of the UE on the basis of the UE list including information about the list of UE admittable to access the femto BS administered in a specific CSG mode. In the UE list, a set of UE ID indicating admittable UE according to each CSG ID may be differently allocated.

If the UE 642 is admitted to access the femto BS 641a, the access request message without the CSG ID is transmitted to the MME 650. If the access of the UE 642 is refused, the existing access request message with the UE ID and the CSG ID is transmitted to the MME 650.

The MME 650 determines whether to perform the access control on the basis of whether the access request message received from the femto cell GW 630 includes the CSG ID. The MME 650 interlocks with the HSS 660 and performs the access control for determining whether to admit the access of the UE 642.

Figure 7:
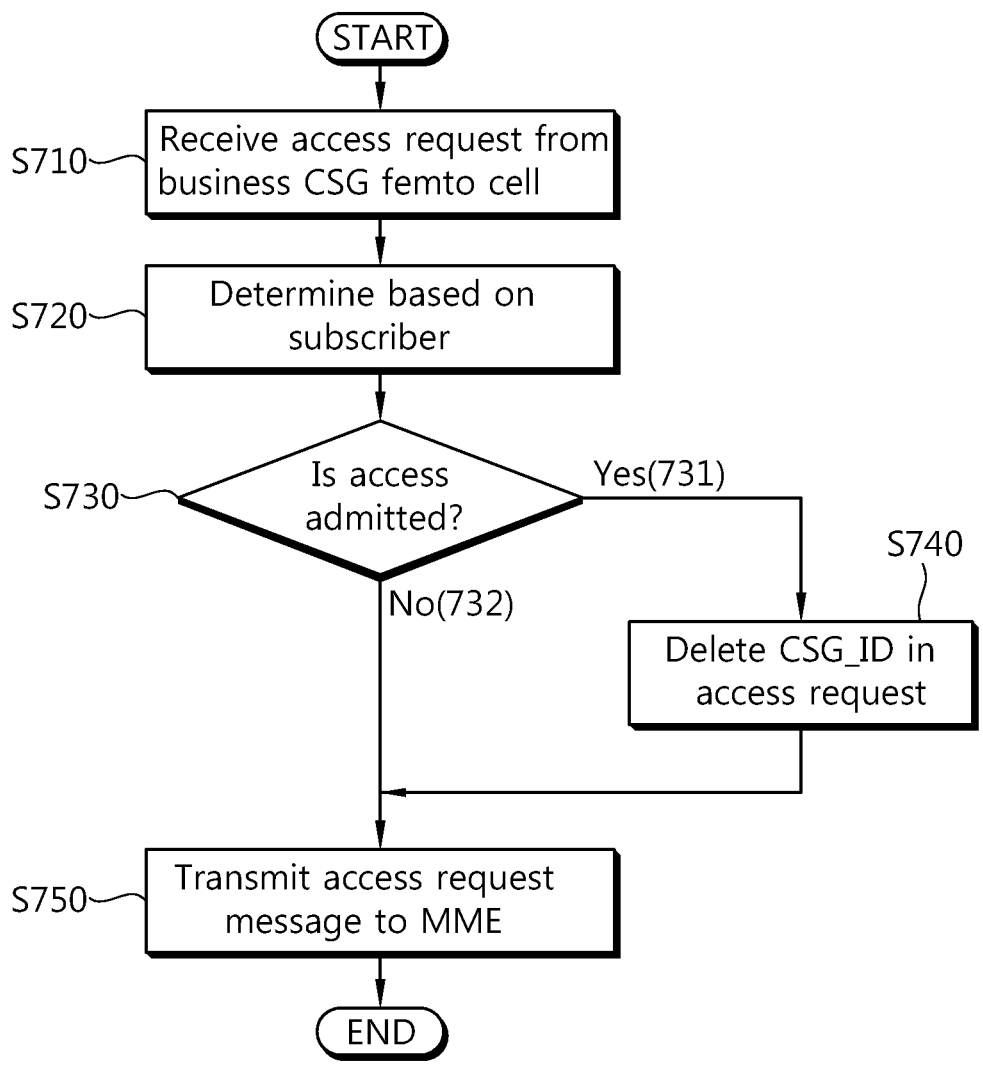
FIG. 7 shows a flowchart showing that a femto cell gateway (GW) performs access control of business-network subscribers in accordance with an exemplary embodiment of the present invention.

FIG. 7 shows a flowchart showing that a femto cell GW performs access control of business-network subscribers in accordance with an exemplary embodiment of the present invention.

Referring to FIG. 7, the femto cell GW 630 receives an access request message with the UE ID and the CSG ID from the femto BS 641a (S710).

The femto cell GW 630 determines whether to admit the access of the UE 642 on the basis of the business subscriber DB (S720). In this case, the femto cell GW 630 directly access the DB module 620 and acquires the business subscriber DB, and it is determined whether the access of the UE is admitted on the basis of the business subscriber DB. Alternatively, whether the access of the UE is admitted may be determined by inquiring the DB without acquiring the DB.

If the access is admitted (S731), the CSG ID is removed from the access request message received from the femto BS 641a (S740) and then the access request message is transmitted to the MME 650 (S750). If the MME 650 receives the access request message excluding the CSG ID, the access admission procedure with the UE is performed without performing the access control with the HSS 660.

On the other hand, if the access is refused (S732), the access request message received from the femto BS 641a is transmitted to the MME 650 (S750). If the MME 650 receives the access request message including the CSG ID, the access control with the HSS 660 is performed. Whether to admit the access is determined on the basis of results from the access control, and the access admission procedure or the access refusal procedure is performed.

Figure 8:
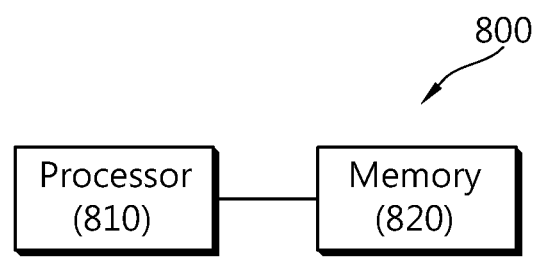
FIG. 8 is a block diagram showing a communication apparatus in which an exemplary embodiment of the present invention is implemented.

FIG. 8 is a block diagram showing a wireless apparatus in which an exemplary embodiment of the present invention is implemented. A communication apparatus 800 may be a femto BS, a femto cell GW, a MME or a part thereof.

The wireless apparatus 800 may include a processor 810, and a memory 820. The processor 810 and the memory 820 may be functionally connected to each other.

The memory 820 may store the UE ID for identifying the UE, and the CSG ID used as a reference for determining whether the femto BS is administered in the CSG mode and whether the access of the UE is admitted, which are included in the received request message. Also, the memory 820 may store the business subscriber DB.

The processor 810 implements the functions of the femto BS, the femto cell GW or the MME in the foregoing exemplary embodiments. The processor 810 generates and transmits the access request message. As necessary, the processor 810 may add or remove the UE ID and/or the CSG ID to or from the access request message.

The processor 810 may determine whether the access of the UE is admittable on the basis of the UE ID and CSG ID included in the access request message and the acquired business subscriber DB. The processor 810 may directly access the DB module storing the business subscriber DB and store it in the memory 820.

The processor 810 may include an application-specific integrated circuit (ASIC), other chipsets, a logic circuit and/or a data processing device. The memory 820 may include a read only memory (ROM), a random access memory (RAM), a flash memory, a memory card, a storage medium and/or other storage devices. If the embodiments are realized by software, the foregoing methods may be implemented by a module (procedure, function, etc.) for performing the above functions.

As described above, the present invention provides a method for controlling access of subscribers in a business internal system if a subscriber environment is changed, for example, accession or secession of a subscriber, or the like in a CSG or hybrid femto cell administered for business like a business or a school campus, thereby providing convenience and operation efficiency to a business femto cell manager. Also, it is possible to efficiently provide proper services to a subscriber in quick response to change in the subscriber environment.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method for controlling access of user equipment (UE) performed by a gateway in a communication system supporting a femto cell, the method comprising:
   receiving a first access request message from an a femto base station (BS), the first access request message requesting an access of an UE to the femto BS;
   directly acquiring a business subscriber database (DB) from a DB module, the business subscriber DB comprising a list of UE admittable to access the femto BS; and
   determining whether to admit the access of the UE on the basis of the business subscriber DB,
   wherein the determining whether to admit the access of the UE comprises admitting the access of the UE if a user equipment identifier (UE ID) for identifying the UE is included in the list of UE,
   wherein the first access request message comprises the UE ID and a closed subscriber group (CSG) ID of the femto BS,
   wherein if the access of the UE is refused,
   the method further comprises transmitting a second access request message to a mobility management entity (MME), the second access request message comprising the UE ID and the CSG ID.

2. The method of claim 1, wherein the transmitting the second access request message comprises forwarding the first access request message to the MME.

3. The method of claim 1, wherein if the access of the UE is admitted,
   the method further comprises transmitting the second access request message comprising the UE ID to a MME.

4. The method of claim 3, wherein the transmitting the second access request message comprises forwarding the first access request message, of which the CSG ID is removed, to the MME.

5. A system for controlling access of user equipment (UE) in a communication system supporting a femto cell, the system comprising:
   a femto base station (BS) which receives a first access request message from an UE and transmits a second access request message to a gateway (GW), the first access request message requesting an access of the UE to the femto BS, the second access request message requesting an access of the UE to the GW;
   a database (DB) module which stores a business subscriber database (DB) comprising a list of UE admittable to access the femto BS; and
   the gateway which receives the second access request message, directly acquires the business subscriber DB from the DB module, and determines whether to admit the access of the UE on the basis of the business subscriber DB,
   wherein the determining whether to admit the access of the UE comprises admitting the access of the UE if a user equipment identifier (UE ID) for identifying the UE is included in the list of UE,
   wherein the first access request message comprises the UE ID,
   wherein the second access request message comprises the UE ID for identifying the UE and a closed subscriber group (CSG) ID of the femto BS,
   wherein if the gateway refuses the access of the UE to the femto BS, the gateway transmits a third access request message comprising the UE ID and the CSG ID to a mobility management entity (MME).

6. The system of claim 5, wherein the transmitting the third access request message to the MME comprises forwarding the second access request message to the MME.

7. The system of claim 5, wherein if the gateway admits the access of the UE to the femto BS, the gateway further transmits a third access request message comprising the UE ID to the MME.

8. The system of claim 7, wherein the transmitting the third access request message to the MME comprises forwarding the second access request message, of which the CSG ID is removed, to the MME.

* * * * *